Patented May 13, 1924.

1,494,059

UNITED STATES PATENT OFFICE.

PHILIPP BURGER, OF BERLIN, GERMANY.

GALVANIC CELL.

No Drawing.  Application filed June 15, 1922. Serial No. 568,631.

*To all whom it may concern:*

Be it known that I, PHILIPP BURGER, a citizen of the German Republic, and resident of Berlin, Germany, have invented a new and useful Galvanic Cell, of which the following is a specification.

It is well known that the carbon electrodes of galvanic elements are surrounded with a mixture of maganese dioxide and acetylene soot, but the manufacture of such cells is extremely difficult because the acetylene soot mass is not solid enough to allow of being pressed by hand; it is and remains loose and crumbles off. On the other hand, if the acetylene soot mass is compressed by power it grows as hard as stone and can take up the electrolyte only slowly and insufficiently.

It is also known to make use of graphite for the manufacture of electrodes, the graphite being then mixed with the manganese dioxide in order to make this latter conductive. One requires comparatively much graphite because this substance has but little surface in proportion to its bulk. But much graphite and little manganese dioxide result in an unproportional heavy element of short duration.

The above-mentioned drawbacks are obviated, according to the present invention, by adding to the acetylene soot but a small quantity of graphite. In this case the good properties of the graphite and of the acetylene soot are not only combined, but the already high conductivity of the soot in question is considerably increased, just by said addition of a small amount of graphite, the individual particles of the acetylene soot being, as it were, coated with a film of graphite molecules and the acetylene soot becoming the carrier of the graphite. In consequence of this a comparatively small number of graphite molecules get a surface of a size and conductivity hitherto unknown and, first of all, the acetylene soot is made capable of being shaped and moulded, as well as rendered slidable. Acetylene soot mixed with but a very small quantity of graphite permits of being pressed to form a solid body which, nevertheless, is sufficiently porous to suck up the electrolyte. Besides, the mass does not stick to the mould. How extraordinarily favorable the effect of the addition of the graphite to the acetylene soot is appears from the fact that already an addition of about 5% is sufficient to bring about the results desired and obtained, but, if desired and preferred, the percentage may be increased up to 20%.

Having now described my invention, what I desire to secure by a patent of the United States is:

1. As a new article of manufacture, a galvanic cell having an electrode composed of manganese dioxide, acetylene soot, and graphite.

2. As a new article of manufacture, a galvanic cell having an electrode composed of manganese dioxide, acetylene soot, and about from 5 to 20% of graphite.

In testimony whereof I have signed my name to this specification in the presence of two subscribing witnesses.

PHILIPP BURGER.

Witnesses:
  REUTHENITS,
  SELMA WOE.